United States Patent [19]

Leyde et al.

[11] 4,167,679

[45] Sep. 11, 1979

[54] FLOATING SET POINT CONTROL CIRCUIT AND METHOD FOR USE WITH ELECTRICAL LOAD CONTROL SYSTEMS

[75] Inventors: Warren L. Leyde, Seattle; Don R. Hall, Edmonds, both of Wash.

[73] Assignee: Pacific Technology, Inc., Renton, Wash.

[21] Appl. No.: 893,018

[22] Filed: Apr. 3, 1978

[51] Int. Cl.² .................................................. H02J 4/00
[52] U.S. Cl. ........................................... 307/35; 307/34; 364/492; 364/118
[58] Field of Search .................... 307/41, 39, 31, 35; 340/147 R; 364/492, 493, 105, 118

[56] References Cited

U.S. PATENT DOCUMENTS

| | | | |
|---|---|---|---|
| 3,914,581 | 10/1975 | Gilson | 364/118 |
| 3,984,663 | 10/1976 | deBuhr | 364/105 |
| 3,987,308 | 10/1976 | Burch | 307/41 |
| 4,034,233 | 7/1977 | Leyde | 307/41 |
| 4,064,485 | 12/1977 | Leyde | 340/147 R |

OTHER PUBLICATIONS

"Monitrol 2 Specification", CSL Industries, 1976.
"Power Management System", CESCO, 1976, Specification.
"Watt-Watcher", Specification, ITE Datametrics, 1974.

Primary Examiner—L. T. Hix
Assistant Examiner—S. D. Schreyer
Attorney, Agent, or Firm—Christensen, O'Connor, Johnson & Kindness

[57] ABSTRACT

In an electrical load control system, an analog signal representing the actual rate of power being consumed by a plurality of loads has a nominal level when the actual rate is at a desired rate, or set point. As the level of the analog signal deviates from its nominal level, the electrical load control system functions to add or shed one or more of the loads to maintain the actual rate at the set point. During times of low power consumption, the electrical load control system may not act to optimize energy usage if the set point is not lowered. A set point control circuit is provided which senses the on-/off status of one of the loads, or control load, and which provides a set point modification signal whose level represents a desired reduction in the set point and which varies in a predetermined range between minimum and maximum levels representing, respectively, no reduction in the set point and a maximum reduction in the set point. Whenever the control load is on, the set point modification signal slowly increases toward its maximum level, and whenever the control load is off, the set point modification signal rapidly decreases toward its minimum level. Summation of the set point modification signal with the analog signal in the electrical load control system effects the desired reduction in set point.

36 Claims, 4 Drawing Figures

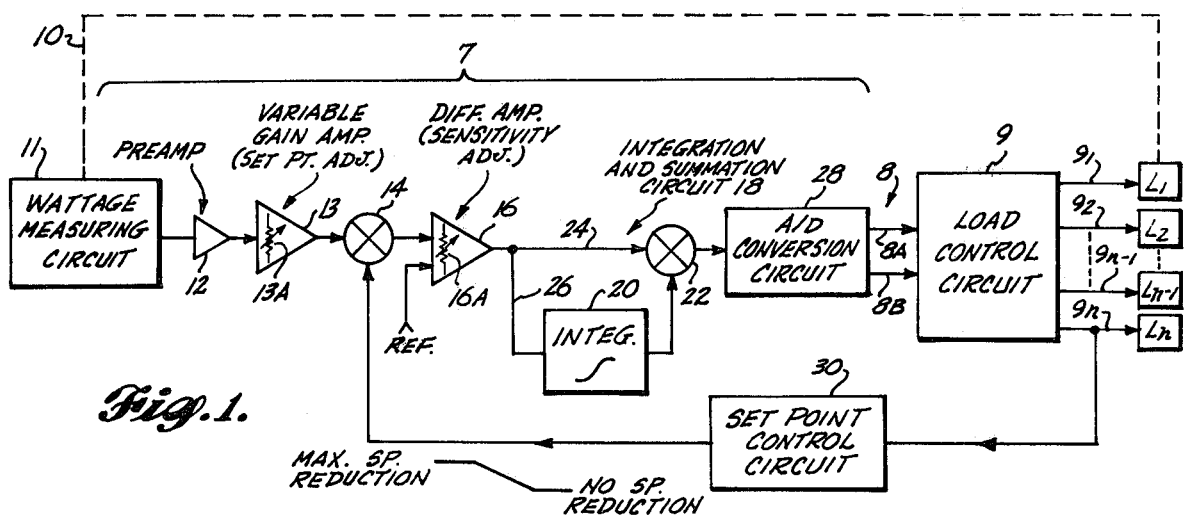
Fig. 1.
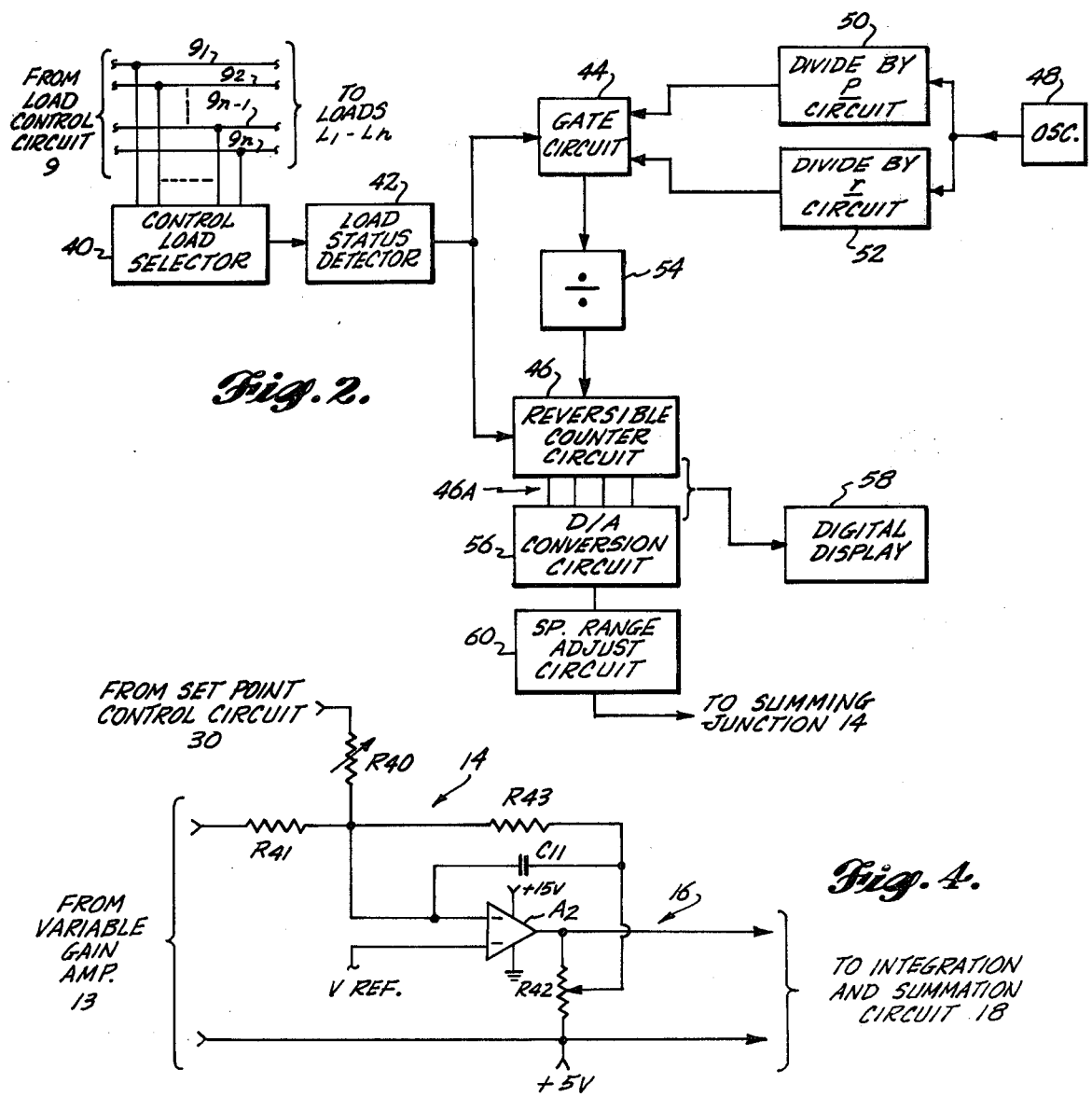
Fig. 2.
Fig. 4.

FLOATING SET POINT CONTROL CIRCUIT AND METHOD FOR USE WITH ELECTRICAL LOAD CONTROL SYSTEMS

FIELD OF THE INVENTION

This invention generally relates to electrical load control systems which operate to maintain the rate of power being consumed by a plurality of electrical loads at or near a predetermined rate of power consumption, or set point, and, more particularly, to a control circuit and method for causing the set point to float, or automatically vary, in a manner such as to optimize energy usage.

BACKGROUND OF THE INVENTION

The prior art teaches electrical load control systems in which the actual rate of power delivered to a plurality of loads is continuously measured and compared with a predetermined rate of power consumption, sometimes referred to as a set point. If the actual rate exceeds the set point, then one or more of the loads are disconnected (shed) to decrease the actual rate of power consumption. If the converse exists, then one or more of the loads are connected (added) to increase the actual rate of power consumption.

The preferred application for such electrical load control systems lies in the regulation of power consumption by electrical utility customers. As is well known, the charge made to each utility customer by the utility is dependent not only on the total energy consumption over a substantial period of time, such as a month, but also on whether or not the total energy consumption over any one of a succession of shorter time periods, referred to as demand intervals, has exceeded a maximum energy demand established by the utility.

When used in such applications, the electrical load control systems may include a power monitoring and regulating circuit which produces an analog signal representing the actual rate of power being consumed by a plurality of loads at the customer's facility. The analog signal is compared within the power monitoring and regulating circuit with a reference signal representing a predetermined rate of power consumption, or set point. When the analog signal exceeds or is less than the reference signal, the power monitoring and regulating circuit functions to produce output signals for effecting load control. These output signals are supplied to a load control circuit that is adapted to control the on/off states of the plurality of loads at the facility. As an example, the output signals may be in the form of one or more shed pulses that direct the load control circuit to shed a load for each shed pulse, with the number of shed pulses being related to the amount by which the actual rate of power consumption exceeds the predetermined rate. Similarly, when the actual rate of power consumption is less than the predetermined rate, one or more add pulses are produced, each such add pulse directing the load control circuit to add one load. The load control circuit may include provisions for determining the sequence in which the plurality of loads at the facility are to be added or shed in accordance with the add and shed pulses from the power monitoring and regulating circuit. For example, a priority sequence may be established in which certain essential loads, such as air conditioning equipment or the like, are shed only after other loads, such as lighting, have been shed, and in which such essential loads are added before such other loads are added. Provision may also be made for adding and shedding certain other loads in a variable, rotating order in response to the add and shed pulses.

The set point, or predetermined rate of power consumption, typically is manually adjusted to represent a maximum, average rate of power consumption that will not permit the total energy consumption over the demand interval to exceed the maximum energy demand established by the utility. As a result, the electrical load control system functions to maintain total energy consumption over each demand interval below the maximum energy demand, and also functions to optimize energy usage at the facility by acting to shed nonessential loads.

However, when the actual rate of power consumption drops substantially below the set point over a relatively long period of time, it will be seen that the electrical load control systems of the prior art do not function to optimize energy usage at the facility, inasmuch as many nonessential loads will be maintained in an on status. This situation typically occurs due to seasonal variations in total energy consumption most often occasioned by a reduction in the amount of power consumed by air conditioning equipment and a reduction in the number of lighting loads.

In such a situation, energy usage can be optimized by lowering the set point to represent an average rate of power consumption consistent with the actual rate of power consumption. However, with the electrical load control systems of the prior art, the customer must physically go to the unit embodying the power monitoring and regulating circuit to lower the set point. Since the decrease in the rate of power consumption occurs over a relatively long period of time, the customer may not realize, for a substantial period of time, that the set point needs readjusting, and even then may not act to readjust the set point. Further, if the set point is lowered, it will be appreciated that a relatively rapid increase in the actual rate of power consumption at the facility will cause the electrical load control system to unnecessarily shed loads, including essential loads, even though the maximum, average rate of power consumption permitted in the demand interval has not been exceeded. As a result, it has been found that the customer usually will not attempt to readjust the set point in periods of lowered energy consumption, thereby resulting in the electrical load control system providing little or no control of the plurality of loads during that time.

It is therefore an object of this invention to provide a floating set point control circuit and method which allow a set point of an electrical load control system to vary from a previously established set point value in a predetermined manner designed to optimize energy usage of the plurality of loads at a facility.

It is another object of this invention to provide such a control circuit and method which allow the set point to decrease at a gradual rate from a previously established set point value during times of relatively low power consumption.

It is yet another object of this invention to provide such a control circuit and method which permit the set point to rapidly increase toward the previously established set point value under certain conditions representing a rapid increase in power consumption.

It is a further object of this invention to provide such a control circuit and method which allows the set point to decrease from a previously established set point value as long as a control load, typically an essential load at the facility, is in an on state, and which permits the set point to rapidly rise toward the previously established set point value when the control load is in an off state.

It is still a further object of this invention to provide such a control circuit and method in which the set point incrementally decreases from and incrementally increases to a previously established value in a predetermined range.

It is yet a further object of this invention to provide such a control circuit in which the rate of set point decreases, the rate of set point increase, the range of set point reduction, and the identity of the control load, are all individually selectable.

SUMMARY OF THE INVENTION

The foregoing objects, as well as others that will be realized from consideration of the remainder of the specification, are achieved by a method which is particularly applicable for use with an electrical load control system operative to maintain the rate of power consumed by a plurality of loads at a set point, the electrical load control system controlling the on and off states of the plurality of loads. The method of the present invention is adapted to reduce the set point from a fixed value thereof to optimize energy usage by the loads during periods when the actual rate of power consumption is significantly below the fixed value. The method includes the steps of detecting whether a control load, comprising one of the plurality of loads, is in an on state or in an off state. Whenever the control load is detected as being in its on state, the set point is gradually decreased. As the set point decreases, the electrical load control system acts to shed som of the loads, preferably in a predetermined order. When the control load, typically the last to be turned off and the first to be turned on, is detected as being in an off state, the set point is rapidly increased toward but not exceeding the fixed value. Preferably, the rate of set point increase is much greater than the rate of set point decrease so that the electrical load control system may function to provide optimum energy usage by the loads in response to decreases in the actual rate of power consumption occurring over a relatively long period of time, and to rapidly increase the set point in response to short term increases in the actual rate of power consumption that might result in the actual rate going above the fixed value.

A typical electrical load control system comprises a power monitoring and regulating circuit including means for producing a first analog signal having a level related to the actual rate that power is being delivered to the plurality of loads, the first analog signal having a nominal level when the actual rate of power consumption is at the set point. A source of a second analog signal is provided whose level is at the nominal level of the first analog signal. Means are provided which are responsive to a comparison of the first and second analog signals to provide a first digital output signal when the first analog signal exceeds the second analog signal by a predetermined threshold amount, and to provide a second digital output signal when the first analog signal is less than the second analog signal by a predetermined threshold amount. The electrical load control system also comprises a load control circuit adapted to receive the first and second digital output signals and to provide a plurality of load control signals representing the desired on/off states of the plurality of loads. The plurality of load control signals are operative to disconnect at least one of the plurality of loads in response to the first digital output signal and to connect at least one of the plurality of loads in response to the second digital output signal.

In such a case, the method of the present invention may be embodied in a set point control circuit for receiving the load control signals and for providing a set point modification signal having a minimum level equal to that of the nominal level, and therefore representing no reduction in the set point, and a maximum level greater than that of the nominal level and therefore representing a predetermined maximum reduction in the set point. The level of the set point modification signal varies between its minimum and maximum levels by increasing toward its maximum level when that one of the load control signals being provided to the control loads signifies that the control load is on, and by decreasing toward its minimum level when that one of the plurality of load control signals being provided to the control load signifies that the control load is off. The rate of decrease of the set point modification signal is much less than the rate of increase thereof. Finally, means are provided for summing the set point modification signal when the first analog signal to effect a shift in the level of the first analog signal by an amount related to the amount by which the level of the set point modification signal deviates from the nominal level of the first analog signal.

In a preferred embodiment, the set point control circuit includes first means adapted to be coupled to at least one of the plurality of load control signals to provide a load status signal having a first logic level when the control load is on, and having a second logic level when the control load is off. A second means provides a first plurality of output pulses occurring at a first predetermined repetition rate, and a third means provides a second plurality of output pulses occurring at a second predetermined repetition rate, the first predetermined repetition rate being much smaller than the second predetermined repetition rate. A reversible counter circuit has a clock input, a count direction input, and an output, the reversible counter circuit being adapted to count in a first count direction to a first predetermined number in response to pulses applied to its clock input when a signal applied to its count direction input has a first logic level, and to count in a second count direction to a second predetermined number in response to pulses applied to its clock input when a signal applied to its count direction input has a second logic level. The reversible counter also provides a digital signal on its output representative of the count contained therein. A gating circuit means couples the first plurality of output pulses to the clock input of the reversible counter circuit when the load status signal has its first logic level, and couples the second plurality of output pulses to the clock input of the reversible counter circuit when the load status signal has its second logic level. A fourth means couples the load status signal to the count direction input of the reversible counter circuit, so that the reversible counter circuit counts in its first count direction when the load status signal has its first logic level, and so that the reversible counter circuit counts in the second count direction when the load status signal has its second logic level. Finally, a fifth means is coupled to the digital signal at the output of said reversible counter circuit for providing the set point modification signal whose level is related to the count within the reversible counter circuit. The set point modification signal varies between a first level, representing no reduction in set point, when the count within the reversible counter circuit is at its second predetermined number, and a second level, representing a maximum reduction in set point, when the count within the reversible counter circuit is at its first predetermined number.

Means are provided for selecting the identity of the control load, for determining the first and second predetermined repetition rates, and for determining the maximum level of the set point modification signal, and therefore, the maximum range of set point reduction.

BRIEF DESCRIPTION OF THE DRAWINGS

The invention can perhaps best be understood by reference to the following portion of the specification, taken in conjunction with the accompanying drawings, in which:

FIG. 1 is a block diagram of an electrical load control system including the floating set point control circuit of the present invention;

FIG. 2 is a general block diagram of the set point control circuit of FIG. 1;

FIG. 4 is a detailed block diagram of a portion of the electrical load control system of FIG. 1 including a summing junction and differential amplifier constructed according to the teachings of the present invention.

DESCRIPTION OF A PREFERRED EMBODIMENT

Figure 3:
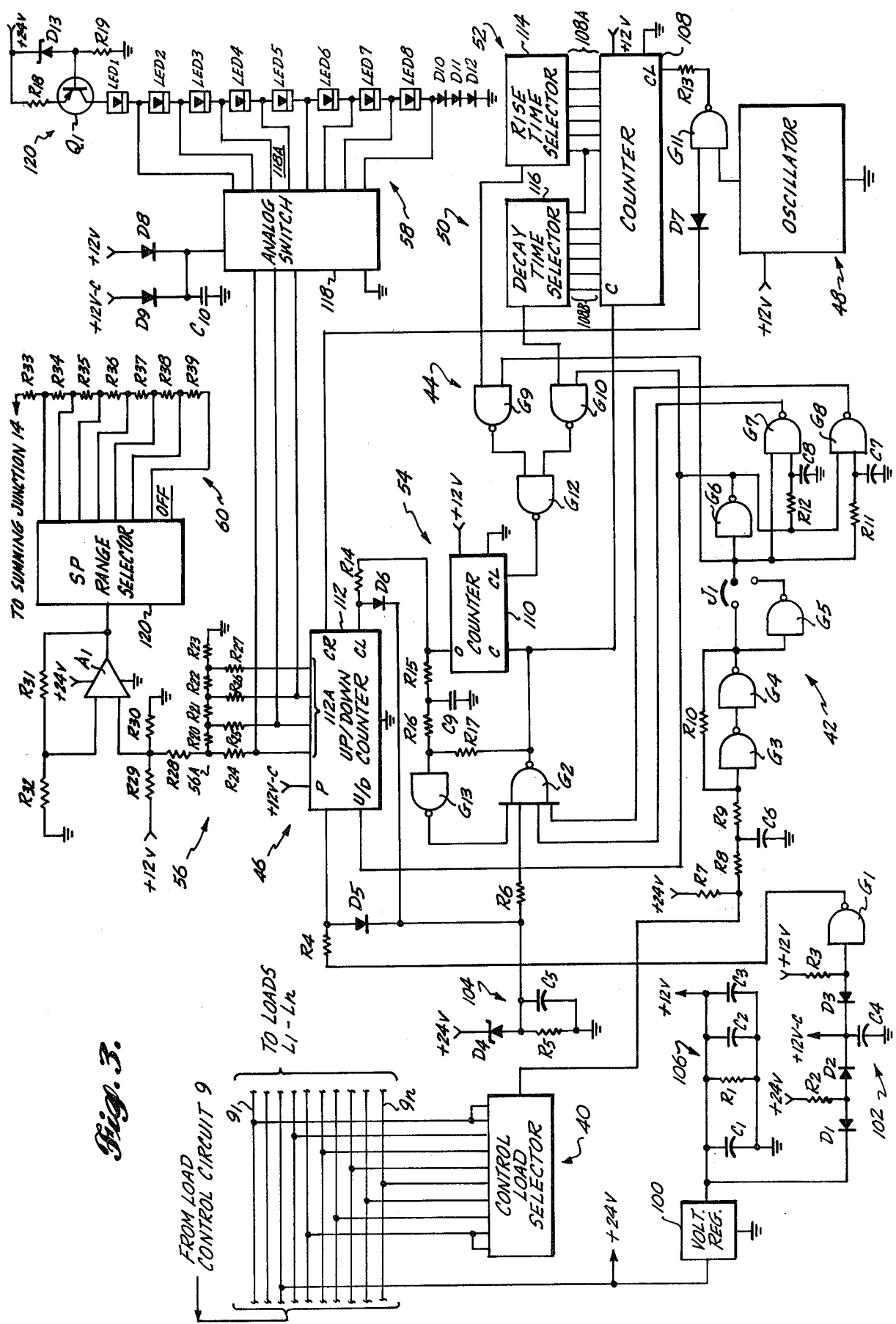
FIG. 3 is a detailed block diagram of the set point control circuit of FIG. 1.

With reference to FIG. 1, a power monitoring and regulating circuit 7 has an analog input, provided by a wattage measuring circuit 11, and a digital output 8. The circuit 7 is connected to form part of a closed loop load control system for monitoring and regulating power delivered by a power source, by measuring wattage with circuit 11 and responsively controlling the power rate by means of a load control circuit 9 connected to receive digital control signals at output 8. Load control circuit 9 has a plurality of outputs $9_1$, $9_2$, ..., $9_{n-1}$, and $9_n$ respectively connected to a plurality of loads $L_1$, $L_2$, ..., $L_{n-1}$, and $L_n$ located at a utility customer's facility. As described in more detail hereinafter, load control circuit 9 provides a plurality of load control signals on its outputs outputs $9_1$-$9_n$ which respectively control the on/off states of the loads $L_1$-$L_n$. The loop is closed by a feedback path 10, representing the power distribution lines that supply power to the loads $L_1$-$L_n$ from the power source (not illustrated). Wattage measuring circuit 11 is adapted for connection to the power source, such as the customer's service, at any suitable location upstream of the point at which the service is distributed to the loads $L_1$-$L_n$. The output of circuit 11 is an analog voltage signal representing the actual rate of power consumption by those of the loads $L_1$-$L_n$ connected to the power source at any given instant.

Preamplifier 12 amplifies the analog voltage signal from circuit 11 and feeds it to a variable gain amplifier 13, whose gain is adjustable to permit a normalizing adjustment to be made in the overall signal gain between circuit 11 and the output of circuit 13. This normalizing adjustment enables the customer to set a desired rate of power consumption, or set point, that the load control system will seek to maintain by regulating the number of loads connected to the power source. Typically, the set point is manually adjustable by means of a potentiometer 13A which varies the gain of variable gain amplifier 13 so that the output signal therefrom has a predetermined voltage level when the actual rate of power consumption is at the set point.

The output signal from variable gain amplifier 13 is connected through a summing junction 14, to be discussed hereinafter, to one input of a differential amplifier 16 for comparison therein with a fixed reference voltage signal that is applied to a second input of differential amplifier 16. The level of the fixed reference voltage signal is chosen so that it is equal to the predetermined voltage level of the output signal from variable gain amplifier 13 occurring when the actual rate of power consumption is at the set point. When the actual rate of power consumption deviates from the set point, differential amplifier 16 provides a set point error signal on its output proportional to the magnitude and sign of the deviation.

The gain of differential amplifier 16 is also adjustable, by means of a manually-adjustable potentiometer 16A, to enable the circuit 7 to have a desired sensitivity so that the digital control signals provided at output 8 are more or less sensitive to deviations of the actual rate of power consumption from the set point.

From the output of differential amplifier 16, the set point error signal is processed by an integration and summation circuit 18 that includes an integrator 20 and a summing amplifier represented as a summing junction 22. The set point error signal is fed in parallel via connections 24 and 26 to one input of summing junction 22 and to integrator 20, respectively. The output of integrator 20, or an integrated set point error signal, is connected to the other input of summing junction 22 so that there appears on the output of summing junction 22 an analog signal, or compensated set point error signal, equalling the summed values of the set point error signal and the integrated set point error signal. In effect, integration and summation circuit 18 modifies the set point error signal so that in the event of a brief overload condition involving an increase in the rate of power consumption above the set point, the loads $L_1$-$L_n$ are regulated so that the brief overload condition does not register as an increase in the maximum energy demand for any given demand interval. The converse situation, in which a brief underload occurs, produces an analogous overload correction of temporary duration.

After processing of the set point error signal by circuit 18, the compensated set point error signal is fed to an analog to digital conversion circuit 28 that converts the compensated set point error signal into one or more time-delayed, add or shed control pulses respectively appearing on output lines 8A, 8B connected to load control circuit 9. Each add control pulse commands the load control circuit to add or connect one of the loads $L_1$-$L_n$ and each shed control pulse commands the load control circuit to shed or disconnect one of the loads $L_1$-$L_n$. The number of add control pulses or shed control pulses that are produced is related to the amount by which the actual rate of power consumption is greater than or less than the set point.

As described to this point, the power monitoring and regulating circuit 7 is substantially similar to that disclosed in U.S. Pat. No. 4,034,233, entitled "Power Monitoring and Regulating Circuit and Method Having an Analog Input Representing Power Rate and Digital Output for Controlling the On/Off States of a Plurality of Loads," Leyde, issued July 5, 1977 to the assignee of the present invention, the disclosure of which is expressly incorporated herein by reference.

Load control circuit 9 can be any one of a variety of known switching circuits of the type having a plurality of outputs each adapted to control an individual load (usually via a load relay), and having a pair of inputs for receiving add and shed control pulses. One of the inputs is connected to the line 8A and is responsive to each add control pulse thereon to provide a corresponding load control signal on one of the outputs $9_1$-$9_n$ to turn on one of the loads $L_1$-$L_n$. Similarly, the other input of load control circuit 9 is connected to the line 8B and is responsive to each shed control pulse thereon to provide a load control signal on one of the outputs $9_1$-$9_n$ to turn off one of the associated loads $L_1$-$L_n$. As one example, load control circuit 9 may comprise an up/down digital counter having a plurality of outputs for controlling load relays and having an up input which is responsive to add control pulses on line 8A and a down input which is responsive to shed control pulses on line 8B. As another example, load control circuit 9 may be similar to that disclosed in U.S. Pat. No. 4,064,485, entitled "Digital Load Control Circuit and Method for Power Monitoring and Limiting Systems," Leyde, issued Dec. 20, 1977 to the assignee of the present invention, the disclosure of which is expressly incorporated herein by reference. Briefly, the embodiment of load control circuit 9 disclosed in U.S. Pat. No. 4,064,485 allows selective grouping of the loads $L_1$-$L_n$ into two groups. The loads in the first group are controlled so that the on/off states of the loads are rotated in a predetermined manner without assigning to any load a priority over the other loads in the group. The second group of loads is controlled in accordance with a fixed priority sequence in which essential, high priority loads in the group are turned off only after nonessential, low priority loads in the group have been turned off, and in which the high priority loads are turned on before the low priority loads are turned on.

A better understanding of the construction and operation of the load control system illustrated in FIG. 1 as described to this point can be had by reference to the aforementioned U.S. Pat. Nos. 4,034,233 and 4,064,485.

In operation, the customer typically adjusts the set point (through manipulation of potentiometer 13A) to represent the maximum, average rate of power consumption permitted during any demand interval. As long as the actual rate of power consumption is close to the set point, it will be appreciated that the load control system in FIG. 1 operates to limit power consumption at the rate established by the set point, by appropriately adding or shedding the plurality of loads $L_1$-$L_n$. However, as the actual rate of power consumption decreases over a relatively long period of time from the set point, such as will be occasioned by climactic changes in which the actual rate of power consumption being consumed by air conditioning equipment and lighting loads, for example, decreases, it will be appreciated that the power monitoring and regulating circuit 7 will continue to generate add control pulses on line 8A which will cause load control circuit 9 to continue to add loads until a point is reached at which all of the loads $L_1$-$L_n$ have been turned on. In short, the load control system in FIG. 1 will at some point cease to provide effective load control unless the set point is lowered to represent the existing rate of power consumption.

To insure that the load control system provides acceptable load control, in an effort to optimize energy usage during periods of low power consumption, the present invention includes a set point control circuit 30 to whose input is provided one of the load control signals on outputs $9_1$-$9_n$ from load control circuit 9. Preferably, that one of the outputs $9_1$-$9_n$ that is selected is that output upon which appears the load control signal going to that one of the loads $L_1$-$L_n$ that has been designated as an essential load having the highest priority, that is, that load which is the last to be turned off and the first to be turned on. In FIG. 1, the highest priority load is designated as load $L_n$, and the set point control circuit 30 is shown as having its input connected to the associated output $9_n$ of load control circuit 9. As discussed hereinafter, set point control circuit 30 may also be connected to each of the outputs $9_1$-$9_n$, and provision may be made within set point control circuit 30 for selecting that one of the loads $L_1$-$L_n$ (hereinafter referred to as the control load) whose load status is to be monitored.

Set point control circuit 30, an embodiment of which is discussed in general hereinafter with reference to FIG. 2 and in detail hereinafter with reference to FIG. 3, provides on its output a set point modification signal which is coupled to an input of summing junction 14 (to whose other input is coupled the output signal from variable gain amplifier 13). The set point modification signal, in its preferred form, comprises an analog voltage signal whose level has minimum and maximum limits representing, respectively, no reduction in the set point and a maximum reduction in the set point. As can be recalled, the output signal from variable gain amplifier 13 has a level equal to that of the fixed reference voltage signal connected to differential amplifier 16 when the actual rate of power consumption is at the set point established by potentiometer 13A. When the set point modification signal is at its minimum level, the summation thereof with the output signal from variable gain amplifier 13 in summing junction 14 results in no change in the level of the signal supplied therefrom to the input of differential amplifier 16. In this case, the load control system continues to control the loads $L_1$-$L_n$ to maintain the actual rate of power consumption at or about the set point established by potentiometer 13A. When the set point modification signal is at its maximum level, the summation thereof with the output signal from variable gain amplifier 13 in summing junction 14 results in an increase in the level of the signal supplied therefrom to differential amplifier 16 by an amount related to the maximum level of the set point modification signal. Essentially, the summation of the set point modification signal from set point control circuit 30 with the output signal from variable gain amplifier 13 in summing junction 14 effects a DC bias shift in the level of the output signal from variable gain amplifier 13 so that the signal compared in differential amplifier 16 with the fixed reference voltage signal appears to represent a higher rate of power consumption than the actual rate of power consumption measured by wattage measuring circuit 11. The maximum level of the set point modification signal is chosen to represent a predetermined percentage reduction in the set point, e.g., 5% to 60% set point reduction.

Let it be assumed that the set point has been manually adjusted by means of manipulation of potentiometer 13A at 200 kw, and that the actual rate of power consumption by the loads $L_1$-$L_n$ is also 200 kw. Under these circumstances, the set point modification signal will be maintained at its minimum level, as a result of which the signal supplied to differential amplifier 16 from summing junction 14 has a level equal to that of the fixed reference voltage signal, so that the load control system controls the loads $L_1$-$L_n$ to maintain the actual rate of power consumption at 200 kw. Now assume that the actual rate of power consumption has decreased over a relatively long period of time to 100 kw. and that the set point modification signal is at its maximum level representing a 50% reduction in the set point. Under these conditions, the signal supplied to differential amplifier 16 from summing junction 14 is again at the level of the fixed reference voltage signal so that the load control system controls the actual rate of power consumption at 100 kw.

Under most circumstances, the set point modification signal will not be at either its maximum or minimum levels, but at some level intermediate those two levels. Let it be assumed that the set point modification signal is at its minimum level and that the control load is on. Under these conditions, the set point modification signal begins a slow increase in level toward its maximum level. Preferably, the rate of increase in the set point modification signal toward its maximum level is very gradual. As an example, the set point control circuit 30 may take a period of over 500 hours to increase the level of the set point modification signal from its minimum to its maximum levels. As the set point modification signal increases toward its maximum level, the summation of the set point modification signal with the output signal from variable gain amplifier 13 in summing junction 14 effects a progressive reduction in the set point so that the set point effectively floats downwardly toward the actual rate of power consumption of the loads $L_1$-$L_n$. If the actual rate of power consumption is below the maximum reduction in set point represented by the maximum level of the set point modification signal, then the set point modification signal will continue to increase to and eventually attain its maximum level. If the actual rate of power consumption is within the rate of set point reduction, then at some point, the load control system will detect an overage in the actual rate of power consumption beyond the set point represented by the input signal to differential amplifier 16, and consequently turn the control load off. When the control load goes off, set point control circuit 30 causes the set point modification signal to begin to decrease from the level it had at the time the control load went off back toward the minimum level. The rate of decrease of the set point modification signal under these conditions is much greater than the rate of increase of the set point modification signal when the control load is on. As an example, it may take thirty minutes for the set point modification signal to decrease from its maximum to its minimum levels. Preferably, the time required for the set point modification signal to increase from its minimum level to its maximum level, or, the time required for the set point to decrease from the fixed value established by potentiometer 13A to its minimum value, is at least 10 times greater than the time required for the set point modification signal to decrease from its maximum level to its minimum level. At the time that the control load again goes on, the set point control circuit 30 terminates the decrease of the set point modification signal and thereafter begins to increase the set point modification signal toward its maximum level from the level it had at the time the control load went on.

It will therefore be appreciated that the present invention continuously tries to lower the set point from a previously-established value to a value which is consistent with the actual rate of power consumption of the loads $L_1$-$L_n$. The actual set point being used as the basis for control therefore closely follows long term variations in the actual rate of power consumption. The rate of increase of the set point modification signal, or the rate of decrease in the set point, must be chosen to be relatively low to inhibit cycling of the set point in response to normal, short term variations in the actual rate of power consumption. The rate of decrease of the set point modification signal, or the rate of increase in the set point, on the other hand must be chosen to be relatively high so that the load control system can rapidly respond to short term increases in the actual rate of power consumption. As discussed hereinafter, the rate of set point reduction, the rate of set point increase, and the range of set point reduction are all individually selectable within the set point control circuit 30.

With reference now to FIG. 2, the embodiment of the set point control circuit 30 illustrated therein includes a control load selector 40 which has a plurality of inputs connected to the outputs $9_1$-$9_n$ of the load control circuit 9. Control load selector 40 may comprise a multiple position, single pole switch which may be manually actuated to couple to its output one of the load control signals from load control circuit 9 to thereby select the control load. Typically, each load control signal will have a first logic level when the associated load is on, and a second logic level when the associated load is off. The output of control load selector 40 is applied to the input of a load status detector 42 which in response provides a LOAD STATUS signal representing the on/off status of the control load.

The LOAD STATUS signal is applied to a control input of a gate circuit 44 and to a count direction input of a reversible counter circuit 46. An oscillator 48 supplies high frequency clock pulses to the inputs of a divide-by-p circuit 50 and a divide-by-r circuit 52 whose outputs are respectively connected to first and second gating inputs of gate circuit 44. Circuit 50 provides one output pulse for every p clock pulses supplied thereto, and circuit 52 provides one output pulse for every r clock pulses supplied thereto. The division factor p in circuit 50 is selectable to determine the rate of increase of the set point modification signal, and the division factor r is selectable to determine the rate of decrease of the set point modification signal. Gate circuit 44 is of a type that couples to its output either the output pulses from circuit 50, or the output pulses from circuit 52, depending upon the LOAD STATUS signal from load status detector 42. The output of gate 44 circuit is coupled through a divider circuit 54 (having a fixed division factor) to a clock input of the reversible counter circuit 46.

The reversible counter circuit 46 may comprise a multibit, bidirectional counter which is clocked by the pulses from divider circuit 54 to count up to a first predetermined number and to count down to a second predetermined number, with the count direction being determined by the LOAD STATUS signal applied to the count direction input thereof from load status detector 42. The count contained within reversible counter circuit 46 represents a desired set point reduction, with the first predetermined number representing a maximum reduction in set point and the second predetermined number representing no reduction in set point. Reversible counter circuit 46 provides a digital signal on its outputs 46A which represents the count contained therein. Outputs 46A are coupled to a D/A conversion circuit 56 which provides an analog output signal whose level is related to the count within reversible counter circuit 46 and to a digital display 58 which accordingly provides a visual indication of the count within reversible counter circuit 46. The analog output signal from D/A conversion circuit 56 is supplied to a set point range adjust circuit 60 which, in its simplest form, may comprise a selectable voltage divider network for adjusting the magnitude of the analog output signal from D/A conversion circuit 56 in accordance with the desired range of set point reduction. The output signal from set point range adjust circuit 60 comprises the set point modification signal and is applied to summing junction 14 (FIG. 1).

In operation, let it be assumed that the control load is on and that the count within reversible counter circuit 46 is at the second predetermined number representing no reduction in set point. Under these conditions, the LOAD STATUS signal provided by load status detector 42 causes gate circuit 44 to couple to its output the output pulses from divide-by-p circuit 50. At this time, reversible counter circuit 46 is also enabled by the LOAD STATUS signal to count up so that the count therein is incremented by one count for every pulse supplied to the clock input thereof from divider circuit 54. The repetition rate of the pulses from divider circuit 54 is determined by the division factor p in circuit 50. As the count within reversible counter circuit 46 increases, the digital signal on outputs 46A also increases in an incremental fashion so that the count is visually indicated by digital display 58. The incremental increase in the digital signal on outputs 46A also results in an incremental increase in the analog output signal from D/A conversion circuit 56, with each incremental increase being converted by set point range adjust circuit 60 into a corresponding incremental increase in the set point modification signal. The amount of each such incremental increase in the set point modification signal is determined by the maximum set point reduction range established by set point range adjust circuit 60 and by the capacity of reversible counter circuit 46. For example, assuming that reversible counter circuit 46 comprises a four-bit counter having sixteen count positions in which the first predetermined number is fifteen and the second predetermined number is zero, and that the set point range adjust circuit 60 is selected to call for a maximum set point reduction of 60%, then each incremental increase in the set point modification signal represents a set point reduction of 4% of the value established by the setting of potentiometer 13A in variable gain amplifier 13 (FIG. 1).

Due to the summation of the set point modification signal with the output signal from variable gain amplifier 13 in summing junction 14, the set point is incrementally lowered in response to each incremental increase in the set point modification signal. If the actual rate of power consumption is below the maximum set point reduction represented by the set point modification signal, then the control load will remain on and the count within reversible counter circuit 46 will continue to increase (in response to the pulses from divider circuit 54) until the count reaches the second predetermined number, or maximum count. At this time, the set point modification signal is at its maximum level representing a maximum desired reduction in the set point established by potentiometer 13A.

If the actual rate of power consumption should thereafter rise above the reduced set point, or if the actual rate of power consumption should go above the reduced set point during the time when reversible counter circuit 46 is counting up, then the control load will at some time thereafter be turned off by the load control system in FIG. 1. When the control load goes off, the LOAD STATUS signal causes gate circuit 44 to couple to its output the pulses from divide-by-r circuit 52 and enables the reversible counter circuit 46 to count downwardly. The count within reversible counter circuit 46 is thereafter decremented from the count contained therein at the time that the control load was turned off and at a rate determined by the division factor r in circuit 52. Preferably, division factor p in circuit 50 is chosen to be much larger than division factor r in circuit 52 so that the rate at which the count in reversible counter circuit 46 is incremented is much less than the rate at which the count in reversible counter circuit 46 is decremented.

The decrease in the count within reversible counter circuit 46 is visually indicated by digital display 58 and also results in a corresponding, incremental decrease in the analog voltage signal from D/A conversion circuit 56. As a result, the level of the set point modification signal from set point range adjust circuit 60 incrementally decreases to result in an incremental increase in the set point controlled by the load control system in FIG. 1. Preferably, each incremental decrease in the set point modification signal equals each incremental increase thereof. As the set point increases back toward the value established by potentiometer 13A, the load control system will at some point again turn on the control load, which point is determined by the actual rate of power consumption. When the control load again goes on, the direction of counting of reversible counter circuit 46 is reversed and the gate circuit 44 is enabled so that the count within reversible counter circuit 46 is thereafter incremented at a rate determined by the division factor p in circuit 50. If the actual rate of power consumption has increased to a level equal to or greater than the set point value established by the potentiometer 13A, it will be appreciated that the control load may remain off for a considerable period of time so that the count within reversible counter circuit 46 goes to the second predetermined number, or minimum count. More typically, the actual rate of power consumption will have risen to a level so that the control load is turned on before the count within reversible counter circuit 46 has been fully decremented.

With reference now to FIG. 3, the control load selector 40 has a plurality of inputs which are connected by appropriate lines to the outputs $9_1$-$9_n$ from the load control circuit 9. These connections may conveniently be made by means of a connector located in a cable interconnecting the outputs $9_1$-$9_n$ with the load-controlling relays for the loads $L_1$-$L_n$. A connection may also be made from a +24 volt supply lead (hereinafter designated +24V) in that connector to the input of a voltage regulating circuit 100, to a power hold-up circuit 102, an initial clear circuit 104, the load status detector 42, the D/A conversion circuit 56, and the digital display 58. The voltage regulating circuit 100 is operative to provide a 12 volt regulated power supply (hereinafter designated +12V) for most of the components of the set point control circuit 30. Noise appearing on the output of voltage regulating circuit 100 is filtered by a filter circuit 106 (including capacitors $C_1$, $C_2$, and $C_3$, and resistor $R_1$, connected in parallel between the output of voltage regulating circuit 100 and ground). As shown in FIG. 3, +12V is supplied to the power hold-up circuit 102, oscillator 48, a counter 108 forming part of the circuits 50 and 52, a counter 110 within divider circuit 54, D/A conversion circuit 56, and digital display 58.

The power hold-up circuit 102 includes diodes $D_1$ $D_2$ connected in series opposition between the output of voltage regulating circuit 100 and one side of a capacitor $C_4$, whose other side is connected to ground potential. A resistor $R_2$ couples +24V to the common junction of diodes $D_1$ and $D_2$. A diode $D_3$ and a resistor $R_3$ respectively couple capacitor $C_4$ and +12V to the input of a gate $G_1$ connected as an inverter. As hereinafter described, gate $G_1$, under certain conditions, produces a PRESET pulse on its output which is coupled through a resistor $R_4$ to a preset (P) input of an up/down counter 112 within reversible counter circuit 46. The voltage across capacitor $C_4$ (hereinafter designated +12V−C) is supplied as a power supply voltage to digital display 58 and to up/down counter 112, for purposes to be hereinafter described.

Within initial clear circuit 104, +24V is applied to one side of a voltage reglating diode $D_4$. A resistor $R_5$ and a capacitor $C_5$ are connected in parallel between the other side of diode $D_4$ and ground potential. A common junction of diode $D_4$, resistor $R_5$ and capacitor $C_5$ is connected by a diode $D_5$ to the preset (P) input of up/down counter 112, by a diode $D_6$ to a clock (CL) input of counter 112, and by a resistor $R_6$ to one input of a NOR gate $G_2$. Under certain conditions, NOR gate $G_2$ provides a CLEAR gate pulse on its output which is coupled to respective clear (C) inputs of counters 108, 110 to reset those counters.

Within the load status detector 42, the output of control load selector 40 is connected to the common junction of a resistor $R_7$ and a resistor $R_8$. Resistor $R_7$ is also connected to +24V, and resistor $R_8$ is also connected to the common junction of a capacitor $C_6$ and a resistor $R_9$. Capacitor $C_6$ is also connected to ground potential and resistor $R_9$ is also connected to the input of a pair of series-connected gates $G_3$, $G_4$ each connected as an inverter. A resistor $R_{10}$ is connected from the output of gate $G_4$ to the input of gate $G_3$ so that resistor $R_{10}$, and gates $G_3$ and $G_4$ together function as an amplifier. Resistors $R_7$, $R_8$, and $R_9$ and capacitor $C_6$ together function to filter out noise from the load control signal appearing on the output of control load selector 40 and the amplifier including resistor $R_{10}$ and gates $G_3$, $G_4$ functions to provide an output signal (hereinafter referred to as the LOAD STATUS signal) which has predetermined logic levels for each on and off state of the control load. The output of gate $G_4$ is connected directly through a gate $G_5$ connected as an inverter, to respective first and second terminals of a jumper $J_1$ also having a single output terminal. The logic level of the LOAD STATUS signal appearing on the output of gate $G_4$ is dependent upon the level of the load control signal on that one of the outputs $9_1$–$9_n$ that has been selected by the control load selector 40. The circuitry of the set point control circuit 30 to be described hereafter requires that the LOAD STATUS signal have a low logic level when the control load is on, and a high logic level when the control load is off. Accordingly, jumper $J_1$ may be selectively placed so that the LOAD STATUS signal appearing on the output terminal thereof has the required logic levels.

The LOAD STATUS signal on the output terminal of jumper $J_1$ is connected to the input of a gate $G_6$ connected as an inverter, to one input of a NAND gate $G_7$, through a resistor $R_{11}$ to one input of a NAND gate $G_8$, and to one input of a NAND gate $G_9$ in gate circuit 44. The output of gate $G_6$ is connected through a resistor $R_{12}$ to the other input of NAND gate $G_7$, to the other input of NAND gate $G_8$, to one input of a NAND gate $G_{10}$ in gate circuit 44, and to an up/down (U/D) input of up/down counter 112. Capacitor $C_7$ is connected from a common junction of resistor $R_{11}$ and the input of NAND gate $G_8$ to ground potential, and a capacitor $C_8$ is connected from a common junction of resistor $R_{12}$ and the input of NAND gate $G_7$ to ground potential. Resistor $R_{11}$ and capacitor $C_7$, and resistor $R_{12}$ and capacitor $C_8$, each form a delay circuit whose purpose will be hereinafter described. The outputs of NAND gates $G_7$, $G_8$ are coupled to respective inputs of NOR gate $G_2$.

The LOAD STATUS signal, directly and through gate $G_6$ functions to enable either NAND gate $G_9$ or NAND gate $G_{10}$ and to control the count direction of up/down counter 112. NAND gates $G_7$ and $G_8$ function to cause NOR gate $G_2$ to provide a CLEAR pulse upon each transition of the control load between its on and off states to reset those counters.

Oscillator 48 has a single output upon which appears a series of clock pulses appearing at a predetermined repetition rate. The output of oscillator 48 is connected to one input of a NAND gate $G_{11}$. A carry (CR) output of up/down counter 112 is connected by a diode $D_7$ to the other input of NAND gate $G_{11}$. Normally, the signal appearing on the carry (CR) output will have a level which will reverse bias diode $D_7$. As a result, the clock pulses appearing on the output of oscillator 48 are normally coupled through NAND gate $G_{11}$ and a resistor $R_{13}$ to a clock (CL) input of counter 108.

Counter 108 may comprise a multibit, unidirectional counter which is operative to count the clock pulses from oscillator 48 to provide pulses at a plurality of outputs thereof, with the pulses at each output having a different, predetermined repetition rate. A first group 108A of the outputs of counter 108 is coupled to the inputs of a rise time selector 114, and a second group 108B of the outpus of counter 108 is connected to the inputs of a decay time selector 116. Generally, the pulses on the first group 108A have a higher repetition rate than the pulses on the second group 108B. Rise time selector 114 and decay time selector 16 may each comprise a multiposition, single pole switch having a single output, with the output of rise time selector 114 being connected to an input of NAND gate $G_9$ and with the output of decay time selector 116 being connected to an input of NAND gate $G_{10}$. By selecting the position of the switches within rise time selector 114 and decay time selector 116, the repetition rates of rise clock pulses and decay clock pulses supplied to NAND gates $G_9$ and $G_{10}$, respectively, may be controlled. As an example, the repetition rates of the pulses at the first group 108A of the outputs of counter 108, and therefore the repetition rate of the rise clock pulses, may be set to represent times of the set point modification signal to decrease from its maximum level to its minimum level of 0.5, 1, 2, 4, 8 or 16 hours. Similarly, the repetition values of the pulses at the second group 108B of the outputs of counter 108, and therefore the repetition rate of the decay time pulses, may be set to represent times of the set point modification signal to increase from its minimum level to its maximum level of 16, 32, 64, 128, 256 or 512 hours.

The outputs of NAND gates $G_9$ and $G_{10}$ are coupled through a NOR gate $G_{12}$ to a clock (CL) input of counter 110 which may comprise a multibit, unidirectional counter operative to provide a single output pulse on its output (O) thereof for every predetermined number of rise clock pulses or decay clock pulses applied to its clock (C) input. The output (O) of counter 110 is coupled through a resistor $R_{14}$ to the clock (CL) input of up/down counter 112, and through series-connected resistors $R_{15}, R_{16}$ to the input of a gate $G_{13}$ connected as an inverter. Capacitor $C_9$ is connected from a common junction of resistors $R_{15}$ and $R_{16}$ to ground potential, and a resistor $R_{17}$ is connected from the input of gate $G_{13}$ to the output of NOR gate $G_2$. Each output pulse from counter 110 accordingly increments the count within up/down counter 112 by one unit and in a direction determined by the LOAD STATUS signal applied through gate $G_6$. Resistors $R_{15}$, $R_{16}$ and $R_{17}$, capacitor $C_9$, and gate $G_{13}$ function to develop a CLEAR pulse (through NOR gate $G_2$) to reset counters 108, 110 after each output pulse from counter 110.

Up/down counter 112 may comprise a four-bit, bidirectional counter which is adapted to contain any number from zero to fifteen which can be incremented or decremented by one unit in response to each pulse supplied to the clock (CL) input. The count within up/down counter 112 is represented by a digital signal appearing at a plurality of outputs 112A thereof.

The digital signal at the outputs 112A is coupled to the digital display 58, and more particularly, to inputs of an analog switch 118 therein. +12V and +12V−C are coupled to a power supply input of analog switch 118 through respective diodes $D_8$ and $D_9$, and a capacitor $C_{10}$ is connected from the power supply input of analog switch 118 to ground potential. Analog switch 118 has a plurality of outputs 118A, and decodes the digital signal at outputs 112A to provide a conducting path between one or more of its outputs 118A and ground potential in response to the count within up/down counter 112.

A circuit including series diodes $D_{10}$, $D_{11}$ and $D_{12}$ couples one side of a series circuit including light emitting diodes $LED_1$–$LED_8$ to ground potential, and a supply circuit 120 couples the other side of the series circuit of light emitting diodes $LED_1$–$LED_8$ to +24V. The supply circuit 120 includes a resistor $R_{18}$ and a voltage regulating diode $D_{13}$ coupling +24V to the emitter and base of a transistor $Q_1$, respectively and a resistor $R_{19}$ coupling the base of transistor $Q_1$ to ground potential.

Each of the outputs 118A of analog switch 118 are connected to the common junction of a pair of the light emitting diodes $LED_1$–$LED_8$ in the series circuit thereof, with the exception that the last such output is connected to the common junction of the light emitting diode $LED_8$ and the series-connected diodes $D_{10}$, $D_{11}$ and $D_{12}$.

When the count within up/down counter 112 is at zero, signifying no reduction in the set point, analog switch 118 provides a conducting path from the common junction of diodes $LED_1$ and $LED_2$ to ground potential. As a result, the light emitting diode $LED_1$ is on (and in fact remains on throughout the operation of the set point control circuit 30). As the count within up/down counter 112 increases, ground potential is applied to succeeding ones of the outputs 118A of analog switch 118, preferably for every two units of increase in the count within counter 112. As an example, when the count within counter 112 goes to three, light emitting diodes $LED_1$ and $LED_2$ will be on, when the count within counter 112 goes to five, light emitting diodes $LED_1$, $LED_2$, and $LED_3$ will be on, and so forth. By physically mounting the light emitting diodes $LED_1$–$LED_8$ in a series arrangement inverted from that illustrated in FIG. 3, (i.e., $LED_1$ is at the bottom and $LED_8$ is at the top), a thermometer-like display indicating the commanded set point reduction is provided.

The outputs of 112A of up/down counter 112 are also coupled to the D/A conversion circuit 56 and more particularly to a voltage divider network therein which includes resistors $R_{20}$, $R_{21}$, $R_{22}$, and $R_{23}$ connected in series between a circuit point 56A and ground potential. Resistors $R_{24}$, $R_{25}$, $R_{26}$, and $R_{27}$ couple the outputs 112A of up/down counter 112 to circuit point 56A, to the common junction of resistor $R_{20}$ and $R_{21}$, to the common junction of resistor $R_{21}$ and $R_{22}$, and to the common junction of resistor $R_{22}$ and $R_{23}$, respectively. It will be appreciated that an analog signal appears at the circuit point 56A which has a certain level with respect to ground potential determined by the count within up/down counter 112.

The analog signal appearing at circuit point 56A is coupled by a resistor $R_{28}$ to a first input of amplifier $A_1$. A resistor $R_{29}$ couples +12V to the first input of amplifier $A_1$, and a resistor $R_{30}$ couples the first input of amplifier $A_1$ to ground potential. A resistor $R_{31}$ is coupled in a feedback loop between the output of amplifier $A_1$ and a second input thereof, and a resistor $R_{32}$ couples the second input of amplifier $A_1$ to ground potential. It will be appreciated that resistors $R_{29}$ and $R_{30}$ effect a DC shift in the level of the analog signal appearing on circuit point 56A and that choice of the value of resistor $R_{31}$ determines the gain of amplifier $A_1$, and therefore the level of an analog voltage signal appearing at the output thereof. As an example, the circuit components may be chosen so that the analog voltage signal at the output of amplifier $A_1$ has a level of approximately +8.5 V when the count within up/down counter 112 is at its minimum value of zero, signifying no set point reduction, and which increases in increments up to a maximum level of approximately 16 VDC when the count within up/down counter 112 is at its maximum value of fifteen, signifying a maximum set point reduction.

The output of amplifier $A_1$ is coupled to the input of a set point range selector 120 within set point range adjust circuit 60 which may comprise a multiposition, single pole switch, having a single input and a plurality of outputs. The set point range adjust circuit 60 also includes a divider network including series-connected resistors $R_{33}$–$R_{39}$ respectively interconnected with the outputs from set point range selector 120. When the set point range selector 120 is set to represent a maximum range of desired set point reduction, then the analog voltage signal from amplifier $A_1$ will be dropped only across resistor $R_{33}$. As the set point range selector 120 is set to represent successively reduced ranges of desired set point reduction, the analog voltage signal from amplifier $A_1$ will be dropped across resistor $R_{33}$ and succeeding ones of the resistors in the divider network. The values of resistors $R_{33}$–$R_{39}$ are chosen to determine the maximum set point reduction ranges (and the incremental set point changes in each of those ranges). For example, the values of resistors $R_{33}$–$R_{39}$ may be chosen to represent, respectively, maximum set point reduction ranges of 60%, 50%, 40%, 30%, 20%, 10% and 5%. The analog voltage signal from amplifier $A_1$, as coupled through the set point range selector 120 and the divider network including resistors $R_{22}$–$R_{39}$, therefore comprises the set point modification signal and is applied to the summing junction 14.

With specific reference now to FIG. 4, the set point modification signal is coupled through an adjustable resistor $R_{40}$ to the inverting input of an amplifier $A_2$ comprising the differential amplifier 16. A resistor $R_{41}$ couples the output signal from variable gain amplifier 13 to the inverting input of amplifier $A_2$. The fixed level voltage reference signal (V REF.) is applied to the noninverting input of amplifier $A_2$. The output of amplifier $A_2$ is connected to the integration and summation circuit 18 (FIG. 1), along with a circuit reference potential (+5 V). A potentiometer $R_{42}$, comprising the sensitivity adjusted potentiometer 16A (FIG. 1), couples the output of amplifier $A_2$ to the circuit reference potential, and the tap of potentiometer $R_{42}$ is coupled to the inverting input of amplifier $A_2$ by parallel-connected resistor $R_{43}$ and capacitor $C_{11}$.

Neglecting for a moment the effect of the set point modification signal, and assuming that V REF. has been set at +8.5 volts with respect to ground potential, it will be appreciated that amplifier $A_2$ provides an output signal equal to the circuit reference potential (+5 V) when the signal at the inverting input of amplifier $A_2$ is at +8.5 V. As previously described, this situation occurs when the actual rate of power consumption is at the set point established by potentiometer 13A. It will also be appreciated that the signal at the output of amplifier $A_2$ decreases in value as the actual rate of power consumption exceeds the set point, and increases in value as the actual rate of power consumption goes below the set point. As previously discussed, when the count within up/down counter 112 is at zero, the set point modification signal has a magnitude of +8.5 V. Under these conditions, summation of the set point modification signal with the output signal from variable gain amplifier 13 at the inverting input of amplifier $A_2$ effects no change in the output of amplifier $A_2$, so that the set point is not reduced. As the count within up/down counter 112 increases, and therefore the set point modification signal increases in value, the signal appearing at the inverting input of amplifier $A_2$ also increases in value. Accordingly, the output signal from amplifier $A_2$ goes below the circuit reference potential, signifying to the remainder of the load control system that the set point has been reduced, even though the actual rate of power consumption may not have changed. Those skilled in the art will realize that the summation of the set point modification signal with the output signal from variable gain amplifier 13 effects a DC shift in the level of the output signal from variable gain amplifier 13 proportional to the desired reduction in set point.

In order to now describe the operation of the embodiment of the set point control circuit 30 illustrated in FIG. 3, let it be assumed that all power has been removed from the set point control circuit 30 for an appreciable period of time and that capacitor $C_4$ in the power hold-up circuit 102 and capacitor $C_5$ in the initial clear circuit 104 have been fully discharged. When power is applied to the set point control circuit 30, the appearance of +24 V causes the capacitors $C_4$ and $C_5$ to begin charging from ground potential toward +24 V. The logic elements in FIG. 3 are designed so that a low logic level is that between ground potential and a predetermined value, and a high logic level is that above the predetermined value. The time constant of capacitor $C_5$ and resistor $R_5$ is chosen to be much less than that of capacitor $C_4$ and resistor $R_2$. As capacitors $C_4$ and $C_5$ charge, low logic levels appear thereacross which are applied to NOR gate $G_2$ and to gate $G_1$. NOR gate $G_2$ in response produces the CLEAR pulse to reset counters 108 and 110. Simultaneously, gate $G_1$ produces the PRESET pulse which is applied through resistor $R_4$ to the common junction of diode $D_5$ and the preset (P) input of up/down counter 112. Due to the fact that capacitor $C_5$ is charging upwardly from ground potential, diode $D_5$ is forward biased to shunt the PRESET pulse from the up/down counter 112 until the voltage across capacitor $C_5$ goes to a high logic level. Since capacitor $C_5$ is charging at a greater rate than is capacitor $C_4$, the voltage thereacross will reach the high logic level before the voltage across capacitor $C_4$ reaches the high logic level. As a result, diode $D_5$ is reverse-biased at some point in time before the termination of the PRESET pulse, so that the PRESET pulse is accordingly coupled to the preset (P) input of up/down counter 112 to set the counter therein at a predetermined count, preferably the middle of the counting range thereof (e.g., at a count of 8). The low logic level across capacitor $C_5$ also forward biases diode $D_6$ to inhibit any output pulse from counter 110 being applied to the clock (CL) input of up/down counter 112 until such a time as the voltage across capacitor $C_5$ reaches the high logic level.

When the voltage across capacitor $C_4$ reaches the high logic level, the PRESET pulse at the output of gate $G_1$ terminates. Capacitor $C_4$ continues to charge until the voltage thereacross is at 12 volts with respect to ground potential (+12V-C), with regulation of +12V-C being accomplished by the connection of +12 V to capacitor $C_4$ through resistor $R_3$ and diode $D_3$.

The preset count within up/down counter 112 is reflected in the digital signal appearing on the outputs 112A thereof. The digital signal, through the D/A conversion circuit 56, causes the analog voltage signal at the output of amplifier $A_1$ to have a level intermediate its maximum and minimum levels, and denoting a desired set point reduction of approximately ½ the maximum reduction thereof. The actual level of the set point modification signal, as coupled to the summing junction 14, will be determined by the position to which the set point range selector 120 has been set. As previously described in conjunction with FIG. 4, the set point modification signal will result in an increase in the level of the signal applied to the inverting input of amplifier $A_2$ to thereby effect the desired set point reduction.

The digital signal on the outputs 112A of up/down counter 112 also cause the analog switch 118 to turn on light emitting diodes $LED_2$–$LED_4$, in addition to light emitting diode $LED_1$, to thereby display that the set point control circuit 30 has reduced the set point by approximately ½ of the maximum range of set point reduction.

Let it be further assumed that the control load (as established by the control load selector 40) is being maintained on by the load control system in FIG. 1, and that the load control signal on the corresponding one of the plurality of outputs $9_1$–$9_n$ from load control circuit 9 has a low logic level. Accordingly, the LOAD STATUS signal at the output of gate $G_4$ will have a low logic level. With jumper $J_1$ in the position illustrated in FIG. 3, the LOAD STATUS signal will disable NAND gate $G_9$, enable NAND gate $G_{10}$ (through gate $G_6$) and set up/down counter 112 to count upwards (through gate $G_6$).

Decay clock pulses (at a repetition rate determined by the setting of decay time selector 116) are accordingly coupled through NAND gate $G_{10}$ and gate $G_{12}$ to the clock (CL) input of counter 110. The count within counter 110 is thereafter increased in response to each decay clock pulse and at the repetition rate of the decay clock pulses until the count therein reaches a predetermined number, at which time the output (O) of counter 110 goes to a high logic level to increment the count in up/down counter by one unit, The low level signal at the output (O) of the counter 110 is applied to the circuit including resistors $R_{15}$, $R_{16}$ and $R_{17}$, and capacitor $C_9$, to appear as a low logic level pulse on the output of gate $G_{13}$ which causes NOR gate $G_2$ to provide the CLEAR pulse to reset counters 108 and 110.

The increased count within up/down counter 112 is reflected in the digital signal on the outputs 112A thereof, which correspondingly causes the set point modification signal supplied to summing junction 14 to be incremented by a predetermined amount (determined by the setting of the set point range selector 120) and which causes the analog switch 118 to additionally turn on light emitting diode $LED_5$. If the control load remains on, counter 110 continues to count at a rate determined by the setting of the decay time selector 116 to further increment the count within up/down counter 112 to effect successively increasing reductions in the set point by means of successive incremental increases in the set point modification signal. As the count within up/down counter 112 increases, the successive light emitting diodes $LED_6$-$LED_8$ are turned on by the analog switch 118. If the control load remains on, the count within up/down counter 112 will increment to its maximum value (e.g., fifteen). At this time, a low level logic will be provided at the carry (CR) output of up/down counter 112 to forward-bias diode $D_7$ and to accordingly disable NAND gate $G_{11}$, inhibiting further counting of counter 108, and therefore of counter 110 and up/down counter 112, to prevent roll-over of the count within up/down counter 112 to zero.

If the control load goes off at any time during incrementing of the count within up/down counter 112, or subsequent thereto, the LOAD STATUS signal at the output of gate $G_4$ switches from a low logic level to a high logic level. As a result, NAND gate $G_{10}$ is disabled (through gate $G_6$) and NAND gate $G_9$ is enabled. In addition, a signal is applied to the up/down (U/D) input of up/down counter 112 (through gate $G_6$) to reverse the counting direction of up/down counter 112. Previous to the time that the control load was turned off, capacitor $C_8$ will have been charged to a high logic level by the output signal from gate $G_6$. When the control load is turned off, the LOAD STATUS signal at the output of gate $G_4$ goes to a high logic level, as previously described, so that the output of NAND gate $G_7$ goes to a low logic level for a period of time determined by the time that it takes for capacitor $C_8$ to discharge down to the low logic level now appearing on the output of gate $G_6$. As a result, NOR gate $G_2$ provides a corresponding CLEAR pulse on its output to reset counters 108, 110.

The count within up/down counter 112 is thereafter decremented from the count contained therein at the time the control load was turned off and at a rate determined by the setting of the rise time selector 114. As the count within up/down counter 112 is decremented, the digital signal on the outputs 112A cause the set point modification signal to incrementally decrease to effect corresponding incremental increases in the set point, and causes the analog switch 118 to control the plurality of light emitting diodes $LED_1$-$LED_8$ so that those ones of the light emitting diodes $LED_1$-$LED_8$ that are energized reflect the count within up/down counter 112, and therefore the amount of set point reduction.

At some point during the decrementing of the count within up/down counter 112, or at some point after the count within up/down counter 112 has reached zero, depending upon the actual rate of power consumption, the load control system of FIG. 1 will turn the control load on. As a result, the LOAD STATUS signal at the output of gate $G_4$ goes to a low logic level to disable NAND gate $G_9$ and to enable NAND gate $G_{10}$ (through gate $G_6$). Also, the output signal from gate $G_6$ goes to a high logic level to accordingly reverse the direction of counting of up/down counter 112. Previous to the time that the control load was turned on, capacitor $C_7$ will have been charged to a high logic level (by the previous high logic level LOAD STATUS signal appearing on the output of gate $G_4$). When the control load is turned on and the LOAD STATUS signal goes to a low logic level, gate $G_6$ provides a high logic level output which causes NAND gate $G_8$ to provide a low logic level output pulse for a period of time determined by the time constant of resistor $R_{11}$ and capacitor $C_7$. As a result, NOR gate $G_2$ provides a corresponding CLEAR pulse on its output to reset counters 108 and 110.

It therefore will be appreciated that the embodiment of the set point control circuit 30 illustrated in FIG. 3 attempts to closely track the actual rate of power consumption by the plurality of loads at the facility, through monitoring the on/off status of the control load. The rate of set point reduction can be varied by adjustment of decay time selector 116, and the rate of set point increase can be varied by adjustment of the rise time selector 114. The increments of set point reduction and of set point increase are equal and are determined by adjustment of the set point range selector 120, as is the maximum range of set point reduction.

Because the set point control circuit 30 adjusts the set point to follow the actual rate of power consumption, it is desirable to insure that the amount of set point reduction being commanded at any given point in time is not lost due to temporary outages in the power being supplied to the set point control circuit 30. It should be noted that capacitor $C_4$ in the power hold-up circuit 102 is coupled to +24V and +12V through respective diodes $D_2$, $D_3$. When a power outage occurs, i.e., +24V is lost, capacitor $C_4$ maintains its charge for a substantial period of time, e.g., 3 minutes, due to the fact that the discharge path for capacitor $C_4$ through the remaining elements of the power hold-up circuit 102 are blocked by diodes $D_2$ and $D_3$. As a result, +12V-C slowly decays from a 12 volt potential with respect to ground to maintain power on the up/down counter 112 and upon the analog switch 118 (through diode $D_9$). Accordingly, up/down counter 112 maintains the count present therein and analog switch 118 maintains its position. If power is restored before the voltage across capacitor $C_4$ has decayed to the low logic level, then counters 108, 110 will be reset by the initial clear circuit 104 as previously described, but the generation of a PRESET pulse by gate $G_1$ will be inhibited due to the fact that the input signal thereto remains at a high logic level. If power is restored after the voltage across capacitor $C_4$ has decayed to the low logic level, then a PRESET pulse will be generated by gate $G_1$ and the operation of the circuit will proceed identically as previously described for initial start-up.

While the invention has been described with reference to a preferred embodiment, it is to be clearly understood by those skilled in the art that the invention is not limited thereto, but rather that the limits of the invention are to be interpreted only in conjunction with the appended claims.

The embodiments of the invention in which an exclusive property or privilege is claimed are defined as follows:

1. A method for use with an electrical load control system which is operative to maintain the rate of power consumed by a plurality of loads at a set point, by controlling the on and off states of the plurality of loads, said method being adapted to reduce the set point from a fixed value thereof to optimize energy usage by the plurality of loads during periods when the actual rate of power consumption is significantly below the fixed value, said method comprising the steps of:
   (a) detecting whether a control load, comprising one of the plurality of loads, is in an on or an off state;
   (b) whenever said control load is detected as being in its on state, gradually decreasing the set point; and
   (c) whenever said control load is detected as being in its off state, rapidly increasing the set point back toward but not exceeding the fixed value.

2. A method as recited in claim 1, wherein the set point is decreased and increased at respective first and second, predetermined rates, said second predetermined rate being much greater than said first predetermined rate.

3. A method as recited in claim 2, wherein the set point is allowed to decrease when said control load is detected as being in its on state only to a predetermined minimum value thereof representing a predetermined range of set point reduction from the fixed value thereof.

4. A method as recited in claim 3, wherein said first and second predetermined rates and said predetermined minimum value are chosen so that the time required for the set point to decrease from the fixed value to said predetermined minimum value is at least ten times greater than the time required for the set point to increase from said predetermined minimum value to the fixed value thereof.

5. A method as recited in claim 2, wherein the set point is decreased and increased in predetermined increments, each comprising a predetermined fraction of the fixed value.

6. A method as recited in claim 5, wherein said predetermined increments of decrease and increase in the set point are equal in value.

7. A method as recited in claim 1, wherein said control load is that one of the plurality of loads that is the last to be turned off and the first to be turned on by the electrical load control system.

8. For use with an electrical load control system operative to turn on and off selected ones of a plurality of loads in response to deviation of the actual rate of power being consumed by the plurality of loads from a set point representing a desired rate of power consumption, the electrical load control system including means for establishing the set point at a fixed value thereof, an improvement comprising a set point control means which acts to optimize energy usage by the plurality of loads during times of low power consumption, said set point control means comprising:
   (a) first means detecting whether a control load, comprising one of the plurality of loads, is in an on state or in an off state;
   (b) second means responsive to said first means for causing the set point to decrease at a first predetermined rate toward but not less than a predetermined, minimum value; and
   (c) third means responsive to said first means for causing the set point to increase at a second predetermined rate toward but not greater than the fixed value, said second predetermined rate being much greater than said first predetermined rate.

9. An improvement as recited in claim 8, wherein said second and third means respectively include means for selecting said first predetermined rate and means for selecting said second predetermined rate.

10. An improvement as recited in claim 8, wherein said second means includes means for selecting said predetermined, minimum value.

11. An improvement as recited in claim 8, wherein said first means includes means for selecting said control load from any one of the plurality of loads.

12. An improvement as recited in claim 8, wherein said second means includes means for lowering the set point in predetermined increments each comprising a predetermined fraction of the difference between the fixed value and said predetermined, minimum value of the set point.

13. An improvement as recited in claim 12, wherein said third means includes means for increasing the set point in predetermined increments each comprising a predetermined fraction of the difference between the fixed value and said predetermined, minimum value of the set point.

14. An improvement as recited in claim 13, wherein said predetermined increments of set point increase and decrease are equal.

15. An improvement as recited in claim 8, wherein said third means includes means for increasing the set point in predetermined increments each comprising a predetermined fraction of the difference between the fixed value and said predetermined, minimum value of the set point.

16. In an electrical load control system comprising a power monitoring and regulating circuit including means for producing a first analog signal having a level related to the actual rate that power is being delivered to a plurality of loads, said first analog signal having a nominal level when the actual rate of power consumption is at a set point representing a desired rate of power consumption, a source of a second analog signal whose level is at said nominal level of said first analog signal, and means responsive to a comparison of said first and said second analog signals to provide a first digital output signal when said first analog signal exceeds said second analog signal by a predetermined, threshold amount, and to produce a second digital output signal when said first analog signal is less than said second analog signal by a predetermined, threshold amount, said electrical load system further comprising a load control circuit adapted to receive said first and second digital output signals and to provide a plurality of load control signals representing the desired on/off states of said plurality of loads, said plurality of load control signals being operative to disconnect at least one of said plurality of loads in response to said first digital output signal, and to connect at least one of said plurality of loads in response to said second digital output signal; an improvement comprising:
  (a) a set point control circuit for receiving said plurality of load control signals and for providing a set point modification signal having a minimum level equal to that of said nominal level of said first analog signal and therefore representing no reduction in said set point, and a maximum level greater than that of said nominal level of said first analog signal and therefore representing a predetermined maximum reduction in said set point, the level of said set point modification signal varying between said minimum and maximum levels by increasing toward said maximum level when that one of said plurality of load control signals being provided to a control load, comprising one of said plurality of loads, signifies that said control load is on, and by decreasing towards said minimum level when said that one of said plurality of load control signals being provided to said control load signifies that said control load is off, the rate of decrease of said set point modification signal being much less than the rate of increase thereof; and,
  (b) means summing said set point modification signal with said first analog signal to effect a shift in the level of said first analog signal by an amount related to the amount by which the level of said set point modification signal deviates from said nominal level of said first analog signal.

17. An improvement as recited in claim 16, wherein said set point control circuit includes means for selecting said control load from any one of said plurality of loads.

18. An improvement as recited in claim 16, wherein said set point control circuit includes means for selecting said first and said second predetermined rates.

19. An improvement as recited in claim 16, wherein said set point control circuit includes means for selecting said maximum level of said set point modification signal.

20. An improvement as recited in claim 16, wherein said set point control circuit includes means for decreasing and increasing said set point modification signal in predetermined increments each comprising a predetermined fraction of the difference between said minimum and maximum levels thereof.

21. A control circuit for use with an electrical load control system operative to measure the actual rate of power consumed by a plurality of loads, and to maintain the actual rate of power consumption at a set point by controlling the on and off states of the plurality of loads through supplying a plurality of load control signals thereto, said control circuit being adapted to provide a set point modification signal usable by the electrical load control system to vary the set point in a predetermined range below a value fixed by the electrical load control system and comprising:
  (a) first means adapted to be coupled to at least one of the plurality of load control signals, and to provide a load status signal having a first logic level when a control load comprising one of the plurality of loads is on, and having a second logic level when said control load is off;
  (b) second means for providing a first plurality of output pulses occurring at a first predetermined repetition rate;
  (c) third means for providing a second plurality of output pulses occurring at a second predetermined repetition rate, said first predetermined repetition rate being substantially lower than said second predetermined repetition rate;
  (d) a reversible counter circuit having a clock input, a count direction input, and an output, said reversible counter circuit being adapted to count in a first count direction to a first predetermined number in response to pulses applied to its clock input when a signal applied to its count direction input has a first logic level, and to count in a second direction to a second predetermined number in response to pulses applied to its clock input when a signal applied to its count direction input has a second logic level, said reversible counter circuit providing a digital signal on its output representative of the count contained therein;
  (e) gating circuit means for coupling said first plurality of output pulses to the clock input of said reversible counter circuit when said load status signal has said first logic level, and for coupling said second plurality of output pulses to the clock input of said reversible counter circuit when said load status signal has said second logic level;
  (f) fourth means for coupling said load status signal to the count direction input of said reversible counter circuit so that said reversible counter circuit counts in said first direction when said load status signal has said first logic level, and so that said reversible counter circuit counts in said second direction when said load status signal has said second logic level; and
  (g) fifth means coupled to said output of said reversible counter circuit for providing said set point modification signal having a level related to the count contained within said reversible counter circuit, said set point modification signal varying between a first level representing no reduction in set point when the count within said reversible counter circuit is at said second predetermined number, and a second level representing a maximum reduction in set point when the count within said reversible counter circuit is at said first predetermined number.

22. A control circuit as recited in claim 21, wherein said first means includes a control load selector having a plurality of inputs each adapted to be coupled to one of the load control signals and said control load selector being controllable to select said control load by coupling to its output one of the load control signals; and, a load status detector responsive to the load control signal on the output of said control load selector to provide said load status signal.

23. A control circuit as recited in claim 21, further comprising an oscillator for providing a plurality of clock pulses having a predetermined repetition rate, and wherein said second means includes a counter circuit for dividing said clock pulses by a fixed division factor p to produce said first plurality of output pulses.

24. A control circuit as recited in claim 23, wherein said second means further includes means for selecting the value of said fixed division factor p.

25. A control circuit as recited in claim 23, wherein said third means includes a counter circuit for dividing said clock pulses by a fixed division factor r to produce said second plurality of output pulses, said fixed division factor r being much smaller than said fixed division factor p.

26. A control circuit as recited in claim 21, further comprising an oscillator for providing a plurality of clock pulses having a predetermined repetition rate, and wherein said third means includes a counter circuit for dividing said clock pulses by a fixed division factor r to produce said second plurality of output pulses.

27. A control circuit as recited in claim 26, wherein said third means includes means for selecting a value of said fixed division factor r.

28. A control circuit as recited in claim 21, wherein said fifth means includes a digital-to-analog conversion circuit converting said digital signal at the output of said reversible counter circuit into an analog signal whose level is related to the count within said reversible counter circuit, and, a set point range adjust circuit for adjusting the level of said analog signal in accordance with a desired maximum range of set point reduction to produce said set point modification signal.

29. A control circuit as recited in claim 21, further comprising a display means responsive to said digital signal at the output of said reversible counter circuit to provide a visual display of the count within said reversible counter circuit.

30. A control circuit as recited in claim 29, wherein said display means comprises a plurality of discrete display devices each having an on and an off state, and an analog switch responsive to said digital signal for controlling the respective on-off states of said plurality of discrete display devices in accordance with the count within said reversible counter circuit.

31. A control circuit as recited in claim 30, wherein said discrete display devices are physically arranged in series alignment so as to provide a thermometer-like display of the count within said reversible counter circuit.

32. A control circuit as recited in claim 31, wherein said discrete display devices comprise light emitting diodes.

33. A control circuit as recited in claim 21, wherein said reversible counter circuit includes an up/down counter adapted to count up to said first predetermined number when said load status signal has said first logic level, and to count down to said second predetermined number when said load status signal has said second logic level.

34. A control circuit as recited in claim 21, further including sixth means for presetting the count in said reversible counter circuit at a number intermediate said first and second predetermined numbers when power is first applied to said control circuit.

35. A control circuit as recited in claim 34, further including seventh means for maintaining the count within said reversible counter circuit for a predetermined period of time after power to said control circuit is lost, and for inhibiting said sixth means for presetting the count in said reversible counter circuit upon the reapplication of power to said control circuit within said predetermined period of time.

36. A control circuit as recited in claim 21, wherein said fifth means varies said set point modification signal in increments corresponding to incremental changes in the count within said reversible counter circuit.

* * * * *